(12) United States Patent
Waldstädt et al.

(10) Patent No.: US 8,808,067 B2
(45) Date of Patent: Aug. 19, 2014

(54) DISCHARGE DEVICE IN THE SHAPE OF AN ESCALATOR

(71) Applicant: Poly-clip System GmbH & Co. KG, Hattersheim (DE)

(72) Inventors: Manfred Waldstädt, Mainz (DE); Michael Theiβ, Altstadt (DE); Detlef Reiter, Wiesbaden (DE)

(73) Assignee: Poly-Clip System GmbH & Co. KG, Hattersheim (DE)

( * ) Notice: Subject to any disclaimer, the term of this patent is extended or adjusted under 35 U.S.C. 154(b) by 33 days.

(21) Appl. No.: 13/624,468

(22) Filed: Sep. 21, 2012

(65) Prior Publication Data

US 2013/0078896 A1  Mar. 28, 2013

(30) Foreign Application Priority Data

Sep. 23, 2011 (EP) .................... 11007775

(51) Int. Cl.
*A22C 11/00* (2006.01)

(52) U.S. Cl.
USPC ........................................... 452/51

(58) Field of Classification Search
USPC .................................. 452/21–51
See application file for complete search history.

(56) References Cited

U.S. PATENT DOCUMENTS

| | | | | |
|---|---|---|---|---|
| 4,192,639 A | * | 3/1980 | Jones, Jr. ............... | 425/372 |
| 4,209,540 A | * | 6/1980 | Jones, Jr. ............... | 426/414 |
| 5,100,364 A | * | 3/1992 | Kollross et al. ........ | 452/185 |
| 6,494,311 B2 | * | 12/2002 | Muller .................... | 198/607 |
| 2010/0046865 A1 | | 2/2010 | Kessler | |

FOREIGN PATENT DOCUMENTS

| | | |
|---|---|---|
| DE | 3437830 A1 | 4/1986 |
| DE | 29516558 U1 | 10/1995 |
| DE | 102006054039 A1 | 5/2008 |
| EP | 0330857 A1 | 9/1989 |
| EP | 0424675 A1 | 5/1991 |
| EP | 1820755 A1 | 8/2007 |
| EP | 1891860 A1 | 2/2008 |
| EP | 2156743 A1 | 2/2010 |
| EP | 2196415 A2 | 6/2010 |

OTHER PUBLICATIONS

DE102006054039—Machine translation obtained from Espacenet (http://worldwide.espacenet.com) on May 14, 2013, 9 pages.

(Continued)

*Primary Examiner* — Richard Price, Jr.
(74) *Attorney, Agent, or Firm* — Hahn Loeser & Parks LLP

(57) ABSTRACT

The present invention relates to a discharge device for discharging sausage-shaped products comprising suspension elements from the discharge end of a clipping machine to a handling device for said sausage-shaped products. The discharge device comprises a first guide for said suspension elements, having a first end and a second end as well as an upper guide surface and two side surfaces and extending from the discharge end of said clipping machine towards the handling device, and second guide arranged at said side surfaces and extending at least approximately between the first and second end of said first guide. The discharge device further comprises transportation units for transporting said suspension elements along said first guide, including transportation elements with engagement elements which engage the second guide and which are guided through said second guide in a transportation direction by said transportation elements.

15 Claims, 3 Drawing Sheets

(56) References Cited

OTHER PUBLICATIONS

DE29516558—Machine translation obtained from Google Translate (http://translate.google.com) on May 16, 2013, 12 pages.
DE3437830—Machine translation obtained from Espacenet (http://worldwide.espacenet.com) on May 14, 2013, 8 pages.
EP0424675—Machine translation obtained from Espacenet (http://worldwide.espacenet.com) on May 14, 2013, 10 pages.
EP0330857—Machine translation obtained from Espacenet (http://worldwide.espacenet.com) on May 14, 2013, 6 pages.
EP1820755—Machine translation obtained from Espacenet (http://worldwide.espacenet.com) on May 14, 2013, 9 pages.
EP1891860—Machine translation obtained from Espacenet (http://worldwide.espacenet.com) on May 14, 2013, 10 pages.
EP2156743—Machine translation obtained from Espacenet (http://worldwide.espacenet.com) on May 14, 2013, 12 pages.
EP2196415—Machine translation obtained from Espacenet (http://worldwide.espacenet.com) on May 14, 2013, 7 pages.

* cited by examiner

DISCHARGE DEVICE IN THE SHAPE OF AN ESCALATOR

This application claims priority to, and the benefit of, European Patent Application No. 11 007 775.7 filed Sep. 23, 2011 with the European Patent Office, which is hereby incorporated by reference.

BACKGROUND OF THE INVENTION

The present invention relates to a discharge device for discharging sausage-shaped products, like sausages, comprising suspension elements, like loops, from a discharge end of a clipping machine to a handling device for said sausage-shaped products.

In particular, the present invention relates to a discharge device for discharging sausage-shaped products, like sausages, comprising suspension elements, like loops, from a discharge end of a clipping machine to a handling device for said sausage-shaped products, the discharge device comprises first guide means for said suspension elements, having a first and a second end as well as an upper guide surface and two side surfaces and extending from the discharge end of said clipping machine towards the handling device, second guide means are arranged at said side surfaces and extending at least approximately between the first and second end of said first guide means.

In practice, it is known that, for example in the production of sausage-shaped products, like sausages, a filling material is fed by a filling machine through a filling tube of a clipping machine into a tubular casing material, which is stored on the filling tube and which is closed at its front end, referred to the feeding direction of the filling material, by a closing clip. The tubular casing material is pulled-off from the filling tube while being filled. After a predetermined volume of filling material has been filled into said tubular casing material, a displacement device with a first and a second pair of displacement elements forms a plait-like portion of the tubular casing material and the clipping machine places and closes at least one closing clip at the plait-like portion forming the back end of the sausage shaped product by respective closing tools which are reversibly movable towards the plait-like portion. Together with said closing clip closing the back end of said sausage shaped product, a suspension element, like a suspension loop, is attached to said back end of said sausage shaped product, enabling the sausage shaped product to be hung up e.g. on a smoking rod or the like. Afterwards, the sausage-shaped product just produced, is separated from the remaining casing material by a knife or the like of a cutting device of the clipping machine and is transferred to a handling device for the next treatment step or a storage device.

From EP patent 0 330 857, an apparatus for positioning sausages discharged from a clipping machine, on a smoking rod is known. The loop of said sausage just produced, is caught by a catching device and guided over a chain guide including a chain conveyor for positioning the sausages on the smoking rod and a tip or sword for catching the loop and guiding said loop to the chain conveyor. Horizontally aligned piston/cylinder arrangements are positioned adjacent to said sword for supporting the sword. For enabling the loop passing the sword, said pistons are alternately retracted according to the production cycle of the clipping machine.

Moreover, EP patent application 2 156 743 discloses a device for transferring a sausage shaped product comprising a suspension loop, from a clipping machine to a storage device, like a smoking rod. The suspension loop is caught by a catching device and guided over a horizontally arranged bar of said transfer device. At its upper surface, said guide bar having a rectangular cross section, includes longitudinally grooves arranged at its upper surface, into which hooks of a transportation device engage for transporting the sausage-shaped products along said bar towards the smoking rod. Bearing elements engage the side surfaces of said bar for supporting the bar. Said bearing elements comprise screw threads at their surfaces for enabling the loop passing said supporting elements, while being along said bar.

By means of the above mentioned known transfer or discharge devices, sausage-shaped products may be discharged from the discharge end of a clipping machine to a handling or storage device, like a smoking rod. But at least the end of said smoking rod directed towards the clipping machine, has to be positioned at the same height level like the discharge end of the clipping machine. Normally, smoking rods are horizontally arranged for securing a sausage hanging thereon at its position. Hanging up sausages having a length extending the vertical height of the discharge end of the clipping machine relative to the bottom level, is not possible with said known transferring devices.

It is an object of the present invention to provide a discharge device with which the above mentioned drawbacks can be overcome and which allows discharging sausage-shaped products from the discharge end of a clipping machine to a handling device independent from their length.

The aforesaid object is achieved by the features of independent claim 1. Advantageous configurations are described in claims 2 to 15.

BRIEF SUMMARY OF THE INVENTION

According to the present invention, there is provided a discharge device for discharging sausage-shaped products, like sausages, comprising suspension elements, like loops, from the discharge end of a clipping machine to a handling device for said sausage-shaped products. The discharge device comprises a first guide means for said suspension elements, having a first and a second end as well as an upper guide surface and two side surfaces, and extending from the discharge end of said clipping machine towards the handling device, and second guide means arranged at said side surfaces and extending at least approximately between the first and second end of said first guide means. The discharge device further comprises transportation units for transporting said suspension elements along said first guide means, including transportation elements with engagement elements which engage the second guide means and which are guided through said second guide means in a transportation direction by said transportation elements.

This configuration of the discharge device allows an alignment of the first guide means in each decided direction, horizontally, up- and downwardly relative to the discharge end of the clipping machine, and thereby, enables discharging sausage-shaped products, in particular relative long sausage-shaped products, from the clipping machine to a handling device over the entire length of the first guide means, independent from the length of the sausage-shaped products and/or the height of the handling device relative to the discharge end of the clipping machine. Thus, the present invention allows particularly a handling of nearly every sausage-shaped products independent from its length.

Moreover, the proposed solution allows an increase of the discharge or transportation speed, respectively, of a machine, like a clipping machine being arranged in front of the inventive discharge device, viewed in the transportation direction. If, in particular, the transportation speed of the driven transportation unit of such a clipping machine is decoupled from the transportation speed of the inventive discharge device, the transportation speed of the transportation unit of the clipping machine can be chosen independently from the transportation speed of the discharge device. The de-coupling can be done by every possible solution. A simple, but effective solution could be formed by a chute being provided between the machine being arranged in front of the inventive discharge device, viewed in the transportation direction, and the inventive discharge device. The chute can be a part of the inventive discharge device or can be a separate element or can be a part of the machine being provided in front of the inventive discharge device. It has to be noted that this idea can be used independently from the described invention in the previous and the following paragraphs.

The first guide means may be of any desired form which enables guiding suspension elements, like loops. In a preferred embodiment of the inventive discharge device, the first guide means for said suspension elements include a guide bar having at least approximately parallel side surfaces. Said guide bar has planar surfaces and is therefore easy to manufacture.

In a further preferred embodiment, the second guide means are formed by grooves extending in said side surfaces. Grooves are also a simple form of guide means and assure a save guidance of the respective elements to be guided therein. Naturally, other guide means are possible, like flanges or rims.

For transporting a sausage-shaped product along the first guide means, the transportation units are preferably carried out by endless chain conveyors having endless conveyor chains, first and second deflection rollers and drive means for commonly drive said endless chain conveyors. Said endless chain conveyors enable a continuous and save transport of the sausage shaped products along the first guide means.

Advantageously, the engagement elements are pins mounted to said endless chain conveyors. In a simple case, the engagement elements are extended link pins of said endless chain conveyor, projecting from said endless chains in a direction of the second guide means such that they can come into engagement with said second guide means. Said link pins are positioned in regular intervals at said conveyor chains. Accordingly, the sausage-shaped products are continuously transported in regular intervals. Moreover, due to the known regular intervals of said extended link pins, by controlling the drive speed of the chain conveyors, an adaption of the conveying speed to the production speed is easily possible.

The use of a chain allows the arrangement of the engagement elements with a relatively small distance between successive engagement elements. Such a small distance allows that the sausage-shaped products to be transported can accidently arrive at the feeding side of the inventive discharge device. In other words, there is no need for a control to ensure that an engagement element is in a receiving position or stand by position, respectively, for a new sausage-shaped product to be transported. The small distance between the engagement elements assures that a sausage-shaped product which just arrives, is certainly captured by one of the engagement elements. Moreover, the small distance between successive engagement elements allows an increase of the transportation speed since, as already stated above, it is not necessary to stop the inventive discharge device for providing one engagement element in a stand by position in which it can take over a sausage-shaped product to be transported. The inventive discharge device can operate continuously since it is assured that one of the engagement elements is able to "grasp" a sausage-shaped product to be transported. It has to be noted that the small distance can also be achieved with other transportation units, for example a transportation unit formed by a conveyor belt at which engagement elements in the shape of pins are fixedly provided.

In a further advantageous embodiment of the discharge device, the first guide means includes a first and a second at least approximately horizontally aligned linear guide section arranged in different vertical heights, coupled by a third linear guide section bridging the difference in height between the first and the second guide section. According to the length of the third linear guide section, the different in height may be selected in adaption to the length of the sausage-shaped products to be produced or in adaption to the difference in height between the discharge end of the clipping machine and the handling device or its receiving end, respectively.

According to a preferred embodiment of the present discharge device, the second guide means in the side surfaces of the first guide means terminate at the upper surface in the region of the first and the second end of the first guide means, whereby the suspension element of the sausage-shaped product may be grasped by the engagement elements of the endless chain conveyors in the region of the first end of the first guide means and released at the second end of the first guide means, respectively, when said engagement elements enter or release the second guide means.

In order to enable the lower chain run of the endless chain conveyors to transport the sausage shaped products along the first guide means including a first and a second horizontally aligned linear guide section arranged in different vertical heights which are coupled by a third linear guide section, the second guide means include a curved portion in the region of the first and second end of the first guide means, forming additional deflections for the lower chain run. For the same purpose, sprocket wheels are provided for forming additional deflections for the upper chain run. Said sprocket wheels are arranged at least approximately vertically above said curved portions in the first guide means.

For discharging sausage-shaped products from the discharge end of a clipping machine to a handling device, in a preferred embodiment of the discharge device, the first end of the first guide means is adapted to be coupled to a catching device of a clipping machine for catching the suspension element attached to a sausage-shaped product. In a simple case, the catching device of the clipping machine is directly attached to the first end of the first guide means. Naturally, also an adapter means may be provided for an adaption of e.g. different cross sections of the first guide means and the catching device, or to bridge a gap between the discharge device and the clipping machine. For adapting the discharge device to different kinds of clipping machines, said adapter means may be provided as a replacement part. Accordingly, an adapter means may also be provided at the second end of the first guide means for adapting said second end to a subsequent device, like a handling or storing device.

The discharge device according to the present invention may also comprise a receiving device coupled to the second end of the first guide means. Said receiving device, as one possible kind of a subsequent device, may receive the sausage-shaped product transferred from the discharge end of the clipping machine to the second end of the first guide means, for further treatment, like storing on a smoking rod or the like.

According to a preferred embodiment, the receiving device includes a belt conveyor having a first and a second deflection roller and an endless conveyor belt wound thereon, for enabling continuously conveying the sausage-shaped products. Naturally, other conveyor means may be provided, like a chain conveyor or the like.

In a further preferred embodiment, the first deflection roller of the receiving device is incorporated in the second end of the first guide means, whereby a closed transport path from the discharge end of the clipping machine to a subsequent handling device is established, without any interruption.

Advantageously, the receiving device includes a drive coupled the drive means of the endless chain conveyors for adapting the transportation speed of the receiving device to the discharge speed of the discharge device.

The drive for the receiving device includes at least a first gear wheel coupled to the drive means of the transportation units, and at least a second gear wheel coupled to the first deflection roller of the belt conveyor of the receiving device. Said gear wheels enable a direct and slippage free drive of the receiving means. Moreover, according to the size of said gear wheel, a predetermined relation between the discharge speed and the transportation speed of the receiving means may be adjusted.

The receiving device can be provided with a positioning system or sewer port, respectively. The positioning system can be formed by every suitable elements, for example by one pair of pins arranged successively in the transportation direction of the sausage-shaped products to be transported. The horizontally arranged pins can reversibly be moved in the horizontal direction into the transportation path of the suspension elements of the sausage-shaped products to be transported. Moreover, a separate control unit and/or the control of the discharge device and/or the control of the machine being arranged behind the inventive discharge device, viewed in the transportation direction, can control each pin such that the first pin being arranged with a certain distance before the second pin, viewed in the transportation direction, is opened, i.e. is moved such that the transportation path of the sausage-shaped products is not blocked, whereas the second pin is arranged such that the transportation path of the sausage-shaped products is blocked. After the suspension element of a sausage-shaped product has passed the first pin, this pin is moved in the blocking position. The second pin can be maintained in the blocking position or can be opened in order to allow a transportation of the sausage-shaped product in the positioning system to the following machine. Such a configuration allows additionally to use the receiving device as a buffer between the inventive discharge device and the following machine, in particular, of the positioning system is arranged in the area of the transportation end of the receiving device. It has to be noted that this idea can be used independently from the inventive discharge device described above or any other item described in the following.

Further advantages and a preferred embodiment will be described in the following together with the drawings listed below. The expressions "left", "right", "below" and "above" are referred to the drawings in an alignment such that the reference numbers used can be read in normal.

DETAILED DESCRIPTION OF THE INVENTION

Figure 1:
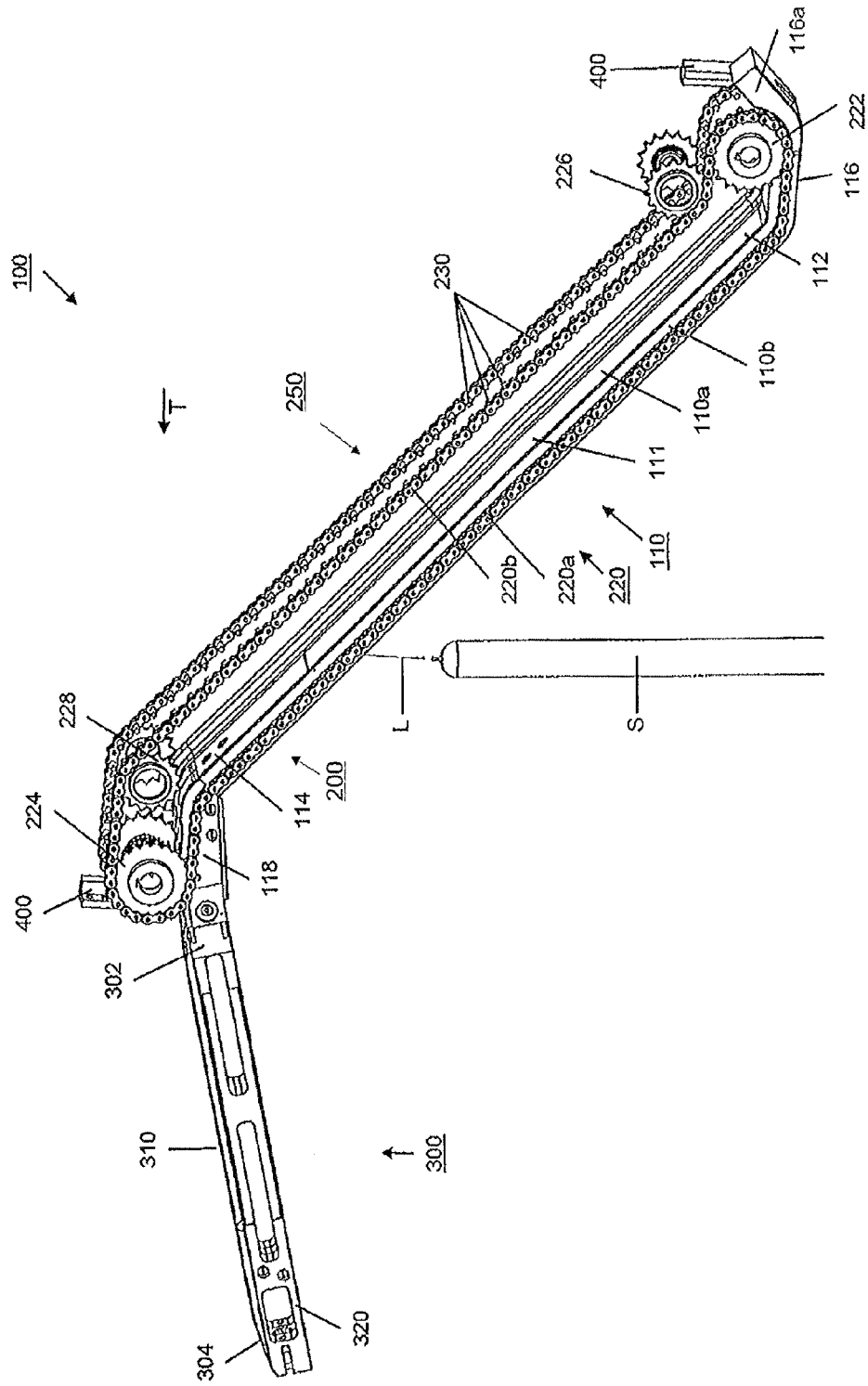
FIG. 1: is a schematically perspective view to a discharge device according to the present invention.

FIG. 1 shows a schematically perspective view to the discharge device 100 according to the present invention. Discharge device 100 comprises first guide means in the form of an approximately linear guide bar 110 of an approximately rectangular cross-section, having a first end 112 and a second end 114. Guide bar 110 extends from the discharge end of a clipping machine arranged in the region of its first end 112, to a handling device arranged downstream the second end 114 of guide bar 110 in a transportation direction T of sausage-shaped products to be transported. Guide bar 110 has an upper surface 110a and two parallel side surfaces 110b from which only one is visible in FIG. 1, in particular the left side surface 110b when viewed in the transportation direction T. A first at least approximately horizontally aligned linear guide section 116 and a second at least approximately horizontally aligned linear guide section 118 are arranged at the first and the second end 112, 114 of third guide section 111 of guide bar 110, respectively. First and second guide sections 116, 118 are of the same, approximately rectangular cross-section as third guide section 111 of guide bar 110. According to FIG. 1, first guide section 116 is positioned at a lower vertical level than second guide section 118. Thus, linear third guide section 111 of guide bar 110, connecting first and second guide sections 116, 118, ascends from its first end 112 to its second end 114 bridging the vertical difference in height between the first and the second guide section 116, 118.

Discharge device 100 further comprises second guide means 120 in the form of grooves (see FIGS. 2 and 3) extending along the side surfaces 110b of guide bar 110 and first, second and third guide sections 116, 118, 111, respectively.

Transportation units 200, 250 are formed by endless chain conveyors 210 and are arranged laterally to guide bar 110. Transportation units or chain conveyors 200, 250 are identically, but mirror imaged constructed. Thus, only chain conveyor 200 will be described in detail. In the following, identical elements of chain conveyors 200, 250 will be denoted by identical reference signs.

As already mentioned, chain conveyor 200 comprises an endless chain 210 forming the transportation element. Endless chain 210 is guided over a first and a second deflection roller 222, 224, forming a lower chain run 220a and an upper chain run 220b. Endless chain 210 further comprises engagement elements 230 in the form of pins. Said engagement elements or engagement pins 230 are link pins of chain 210 and are directed towards guide bar 110 as well as first, second and third guide sections 116, 118, 111, respectively. Engagement pins 230 extending equidistantly along endless chain 210, wherein engagement pins 230 of the lower chain run engage second guide means or grooves 120 in side surfaces 110b of guide bar 110, in first, second and third guide sections 116, 118, 111.

First and second guide sections 116, 118 are coupled to third guide section 111 of guide bar 110 by respectively curved portions. First and a second deflection rollers 222, 224 are positioned above first and second guide sections 116, 118. For enabling the lower chain run 220a to be guided laterally and parallel to guide bar 110 and first second and third guide sections 116, 118, 111, second guide means or grooves 120 in side surfaces 110b of guide bar 110 comprising a first linear portion 122 extending along third guide section 111 of guide bar 110 and second linear portions 124 extending along first and second guide sections 116, 118 connected to first linear portion 122 by respective curved groove portions. Moreover, for enabling engagement pins 230 of lower chain run 220a and upper chain run 220b entering or leaving grooves 120, second linear portions 124 of grooves 120 terminate in at the upper surface of first and second guide sections 116, 118. Additionally, a first sprocket wheel 226 is positioned above upper chain run 220b in the region between first guide section 116 and the first end 112 of guide bar 110, and a second sprocket wheel 228 is positioned below upper chain run 220b in the region between second guide section 118 and the second end 114 of guide bar 110, for deflecting upper chain run 220b to be parallel to lower chain run 220a, and to guide bar 110, respectively.

Chain conveyors 200, 250 further comprise a common drive (not shown in FIG. 1). Said drive includes a shaft to which one of the first or second deflection rollers 222, 224 are coupled e.g. by a tongue and groove joint as indicated by the grooves in the central bores of first or second deflection rollers 222, 224. Said drive for driving chain conveyors 200, 250 may be controlled by the control unit of the clipping machine, e.g. in accordance with the production cycle of said clipping machine. Alternatively, chain conveyors 200, 250 may also be driven via sprocket wheels 226, 228.

Furthermore, in FIG. 1, a sausage shaped product S is shown, positioned at and vertically held by discharge device 100 with its suspension element or loop L drawn over and guided along guide bar 110.

Moreover, as it can be seen in FIG. 1, the free end of first guide section 116, directed towards the clipping machine, is bent upwardly for enabling sausage shaped product S drawn over said first guide section 116 by its suspension element or loop L, to be shifted into the region of the chain conveyors 200, 250 only by the force of its own weight.

As it further can be inferred from FIG. 1, a receiving device in the form of a belt conveyor 300 having a first end 302 and a second end 304, is positioned downstream the discharge device 100 and arranged in transportation direction T. The first end 302 of belt conveyor 300 is coupled to second guide section 118, thereby avoiding a gap in the transportation path of the sausage-shaped product S when discharged from the clipping machine and transferred to the receiving device or belt conveyor 300 by discharge device 100. Belt conveyor 300, which will be described in detail in conjunction with FIG. 3, amongst others, comprises an endless conveyor belt 310 and a longitudinal bar-shaped main body 320 which extends in transportation direction T and slightly downwardly for supporting the transport of a sausage-shaped product S received from discharge device 100.

Reference number 400 denotes a covering device for covering lower chain runs 220a of chains 210, for preventing e.g. an operator from being caught by chains 210 of chain conveyors 200, 250 when running. In FIGS. 1 to 4, only covering device 400 of chain conveyer 250 is shown. Covering device 400 of chain conveyer 200 has been left out, but normally, it is present.

Figure 2:
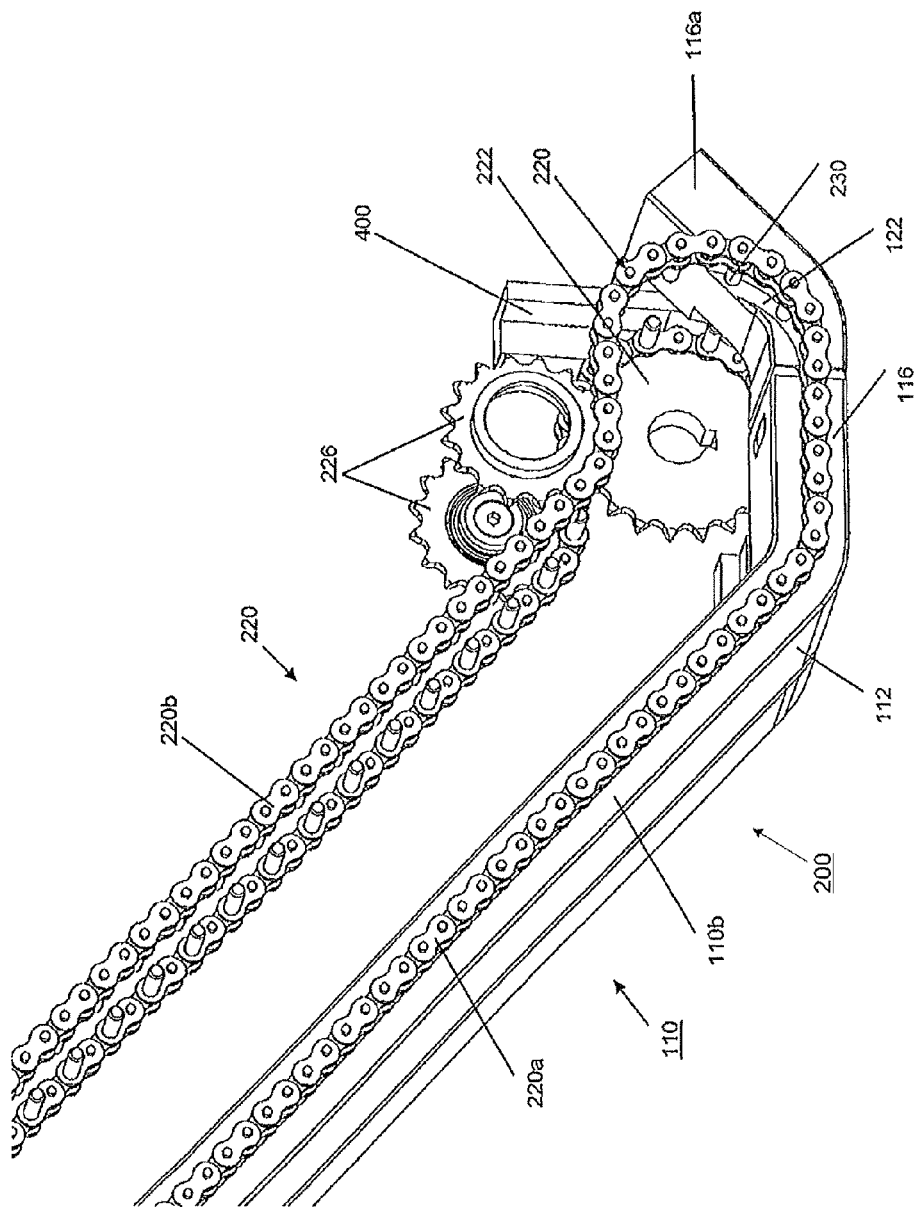
FIG. 2: is a detailed perspective view to the clipping machine side end of the discharge device according to FIG. 1.

FIG. 2 is a detailed perspective view to the clipping machine side end of discharge device 100 according to FIG. 1. For clarification matter, deflection roller 222 of chain conveyer 200 has been omitted. As it can be seen in FIG. 2, the free end 116a of first guide section 116 is bent upwardly. The upwardly bent portion of first guide section 116 has an approximately rectangular cross-section. A catching device for catching the suspension loop L of a just produced sausage-shaped product S, like a catcher pin or needle, may be coupled thereto. Depending on the shape of the catching device, the cross-section of said bent portion may differ from the shown rectangular shape. Alternatively, an adapter means for adapting the approximately rectangular cross-section of first guide section 116 to the cross-section of the catching device may be coupled to first guide section 116.

Groove 120 extends along side surface 110b of guide bar 110 and first linear portion 122 extending along first and second guide sections 116, 118. As it can further be seen in FIG. 2, first linear portion 122 of groove 120 has a curved end portion, thus, first linear portion 122 terminates at the upper surface of first guide section 116. The curved end portion of first linear portion 122 of groove 120 is aligned to the curvature or the diameter of first deflection roller 222 and allows engagement pins 230 to be guided into groove 120 when chain 220 of chain conveyer 200 is moved in transportation direction T.

Figure 3:
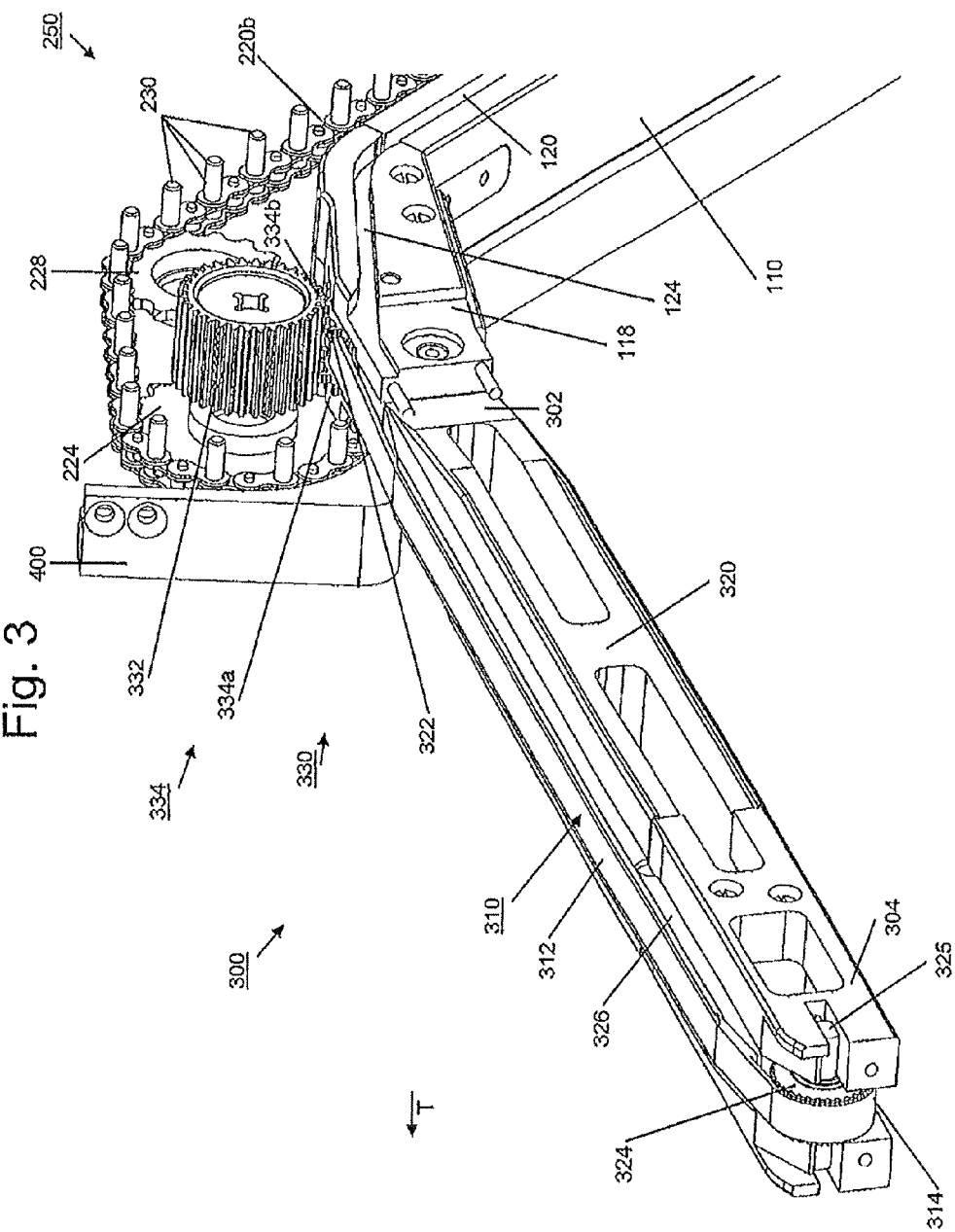
FIG. 3: is a detailed perspective view to the handling device side end of the discharge device according to FIG. 1 and the receiving device coupled to this end.

FIG. 3 shows a detailed perspective view to the handling device side end of discharge device 100 according to FIG. 1 and receiving device 300 coupled to this end. In FIG. 3, only chain conveyor 250 is shown, chain conveyer 200 has been left.

The handling device side end of discharge device 100 is constructed similarly to the clipping machine side end of discharge device 100. Horizontally aligned second guide section 118 is coupled to guide bar 110 by a respective curved portion. Groove 120 extending along side surface 110b of guide bar 110 and second linear portion 124 extending along the side surface of second guide section 118 are coupled by a respectively curved portion. Second linear portion 124 of groove 120 provides, similar to first linear portion 122, a curved end portion, and thus, second linear portion 124 terminates at the upper surface of second guide section 118, to enable engagement pins 230 to be guided out of groove 120, or second linear portion 124 respectively, when chain 220 of chain conveyer 200 is moved in transportation direction T.

As it can be seen in FIG. 3, receiving device 300 is coupled to the handling device side end of discharge device 100. Receiving device 300, which, according to the present embodiment, is designed as an endless band conveyor, comprises a longitudinal bar-shaped main body 320 which extends in transportation direction T. Receiving device or belt conveyor 300 has a first end 302 directed towards discharge device 100 and a second end 304 directed in transportation direction T. Belt conveyor 300 extends slightly downwardly in transportation direction T for supporting the transport of a sausage-shaped product S received from discharge device 100.

Belt conveyor 300 comprises a first deflection roller 322 positioned at first end 302 and a second deflection roller 324 positioned at second end 304 of belt conveyor 300, both rotatably supported in main body 320. Conveyor belt 310 is wound around deflection rollers 322, 324, thereby forming an upper run 312 and a lower run 314. In the region of upper and lower run 312, 314, elevated slide portions 326 are provided on main body 320 of belt conveyor 300, extending between main body 320 and upper and lower run 312, 314 of conveyor belt 310 for facilitating the transport of the sausage-shaped product S hanging thereon by its suspension loop L.

Belt conveyor 300 is coupled to second guide section 118 by its first end 302. In particular, main body 320 is attached to the handling device side end of second guide section 118 and fixed thereto by respective fixing means, like screws (not shown). First deflection roller 322 of belt conveyor 300 is approximately vertically positioned below the rotation axis of second deflection rollers 224 of chain conveyors 200, 250.

For driving belt conveyor 300, a drive 330 is provided, including a first gear wheel 332 and a second gear wheel 334. First gear wheel 332 is mounted on the rotation axis of second deflection rollers 224 of chain conveyors 200, 250 and centrally between deflection rollers 224. Second gear wheel 334 is composed of two small gear wheels 334a, 334b arranged at both sides of first deflection roller 322 of belt conveyor 300, and on its rotation axis. The outer diameters of first and second gear wheels 332, 334 are adjusted to enable first and second gear wheels 332, 334 to engage each other. The outer diameter of second gear wheel is slightly larger than the outer diameter of first deflection roller 322 to allow conveyor belt 310 to be guided around first deflection roller 322 without being engaged by first and second gear wheels 332, 334.

First gear wheel 332 is mounted on the rotation axis of second deflection rollers 224 of chain conveyors 200, 250 and thus, driven at the same speed. Accordingly, second gear wheel 334 driven by first gear wheel 332, drives first deflection roller 322 of belt conveyor 300 and conveyor belt 310, accordingly. Depending on the diameters of second deflection rollers 224 of chain conveyors 200, 250, first and second gear wheels 332, 334 and first deflection roller 322, the transportation speed of conveyor belt 310 may be adapted to the speed of conveyor chains 220, e.g. in order to synchronize the transportation speed of the sausage-shaped products S of discharge device 100 and belt conveyor 300.

Second deflection roller 324 of belt conveyor 300 is mounted on an axle 325 held in elongated slots in the second end 304. Adjusting means are provided (not shown) for adjusting axle 325 in said elongated slots for applying a predetermined tension to conveyor belt 310.

For discharging a sausage-shaped product S from a clipping machine, suspension loop L caught by a catching device, like a catcher needle, is transferred to first guide section 116. By the force of its weight, the sausage-shaped product S slides down the upwardly bent portion of first guide section 116. Suspension loop L surrounding first guide section 116, is thereby positioned in the region of first linear portion 122 of groove 120. Suspension loop L is grasped by engagement pins 320 of conveyor chains 220, which are entering first linear portion 122, and guided along first guide section 116, guide bar 110 (as shown in FIG. 1) and second guide section 118. When reaching second guide section 118, engagement pins 320 release suspension loop L from second linear portion 124 of groove 120 by leaving second linear portion 124. Suspension loop L is positioned on the first end 302 of belt conveyor 300, in particular on upper run 312 of conveyor belt 310 above first deflection roller 322.

Belt conveyor 300 driven by drive 330, transports the sausage-shaped product S in transportation direction T towards its second end 304. A handling device (not shown), which may include e.g. a smoking rod, is positioned in the region of the second end 304 of belt conveyor 300. Sausage shaped product S may than be positioned on said smoking rod for further treatment.

It has to be noted, that the first guide means, guide bar 110 with first, second and third guide sections 116, 118, 111, of discharge device 100 together with band conveyor 300 attached thereto, is held by the engagement pins guided in grooves 120. No additional supporting means are necessary for holding said first guide means in position. Finally, discharge device 100 and belt conveyor 300 are held by the axels of first and second deflection rollers 222, 224.

According to the embodiment of FIGS. 1 to 3, discharge device 100 includes chain conveyors 200, 250. Naturally, other kinds of conveyors may be used, e.g. band conveyors, may be used for transporting a sausage shaped product S along guide bar 110.

In specific cases, horizontally aligned first and second guide sections 116, 118 need not to be present. Moreover, in some cases, only one of the first and second guide sections 116, 118 may be provided, e.g. in case that a catching device is directly coupled to the first end 112 of guide bar 110. Also belt conveyor 300 may be directly coupled to second end 114 of guide bar 110.

Also the cross-section of the first guide means, described as being of an approximately rectangular shape, may be of any suitable cross-section, like a triangular or circular cross-section.

The invention claimed is:

1. A discharge device for discharging sausage-shaped products, like sausages, comprising suspension elements, like loops, from a discharge end of a clipping machine to a handling device for said sausage-shaped products, the discharge device comprising:
   a first guide means for said suspension elements having a first end and a second end as well as an upper guide surface and two side surfaces and extending from the discharge end of said clipping machine towards the handling device,
   a second guide means arranged at said side surfaces of said first guide means and extending at least approximately between the first and second end of said first guide means, and
   transportation units including transportation elements with engagement elements which engage the second guide means and which are guided through said second guide means in a transportation direction by said transportation elements, for transporting said suspension elements along said first guide means and for holding the first guide means without using additional supporting means.

2. The discharge device according to claim 1, wherein the first guide means for said suspension elements include a guide bar having at least approximately parallel side surfaces.

3. The discharge device according to claim 1, wherein the second guide means are formed by grooves extending in said side surfaces of said first guide means.

4. The discharge device according to claim 1, wherein the transportation units comprise endless chain conveyors having endless conveyor chains, first and second deflection rollers and drive means for commonly drive said endless chain conveyors.

5. The discharge device according to claim 1, wherein the engagement elements are pins mounted to said endless chain conveyors.

6. The discharge device according to claim 5, wherein the engagement elements are extended link pins of said endless chain conveyor, projecting from said endless chains.

7. The discharge device according to claim 1, wherein the first guide means include a first and a second at least approximately horizontally aligned linear guide section arranged in different vertical heights, coupled by a third linear guide section bridging the difference in height between the first and the second guide section.

8. The discharge device according to claim 1, wherein the second guide means in the side surfaces of the first guide means terminate at the upper surface in the region of the first and the second end of the first guide means.

9. The discharge device according to claim 8, wherein the second guide means include a curved portion in the region of the first and second end of the first guide means, forming additional deflections for the lower chain run, and wherein sprocket wheels are provided for forming additional deflections for the upper chain run.

10. The discharge device according to claim 1, wherein the first end of the first guide means is adapted to be coupled to a catching device of a clipping machine for catching the suspension element attached to a sausage-shaped product.

11. The discharge device according to claim 1, further comprising a receiving device coupled to the second end of the first guide means.

12. The discharge device according to claim 11, wherein the receiving device includes a belt conveyor having a first and a second deflection roller and an endless conveyor belt wound thereon.

13. The discharge device according to claim 12, wherein the first deflection roller of the receiving device is incorporated in the second end of the first guide means.

14. The discharge device according to claim 11, wherein the receiving device includes a drive coupled the drive means of the endless chain conveyors.

15. The discharge device according to claim 14, wherein the drive for the receiving device includes at least a first gear wheel coupled to the drive means of the transportation units, and at least a second gear wheel coupled to the first deflection roller of the receiving device.

\* \* \* \* \*